June 25, 1974   3,819,782

PROCESS FOR PRODUCING A LIGHT-CONDUCTING STRUCTURE

Original Filed Sept. 17, 1969

United States Patent Office 3,819,782
Patented June 25, 1974

3,819,782
PROCESS FOR PRODUCING A LIGHT-CONDUCTING STRUCTURE
Masanori Irie, Amagasaki, Japan, assignor to Nippon Selfoc Kabushiki Kaisha, Tokyo-to, Japan
Original application Sept. 17, 1969, Ser. No. 858,866, now abandoned. Divided and this application Aug. 6, 1971, Ser. No. 169,874
Int. Cl. B29d 27/00
U.S. Cl. 264—49                                    10 Claims

ABSTRACT OF THE DISCLOSURE

Light-conducting structures each having a gradual refractive index gradient in a direction transverse to the direction in which light is to advance in the structure, which structure is made of a transparent mixture of at least two synthetic polymers having different refractive indexes, the proportions of the polymers in the mixture being such that they vary progressively in a direction transverse to the direction in which light is to advance thereby to create the refractive index gradient. This variation in the mixture of at least two polymers is produced by selective extraction of the mixture by a solvent in which one polymer in the mixture is soluble but the other polymer is less soluble.

This is a division of application Ser. No. 858,866, filed Sept. 17, 1969 and now abandoned.

BACKGROUND OF THE INVENTION

The present invention relates generally to light-conducting structures and more particularly to new light-conducting structures each made of synthetic resin having a refractive index gradient in a direction transverse to the direction in which light is to advance in the structure, and to the production thereof.

The conventional light-conducting structure made of synthetic resin consists of a core for light conduction having higher refractive index and a coating thereover having lower refractive index. In such a light-conducting structure, an incident light beam entering thereinto from one end thereof advances therein with repetition of total reflection thereby to cause lagging or aberration in the phase velocity and the loss of light due to the reflection.

In order to overcome these drawbacks, a light-conducting glass structure has been proposed in which the refractive index is reduced gradually toward the surface from the center axis, as set forth in copending U.S. Patent Application Ser. No. 806,368, filed Mar. 12, 1969 and commonly assigned and now abandoned in favor of application Ser. No. 147,256, filed May 26, 1971.

SUMMARY OF THE INVENTION

An object of the present invention is to provide a method for producing novel light-conducting structures made of synthetic resin without entailing drawbacks as described above.

Another object of the invention is to provide a method for producing light-conducting structures having such advantages as lower manufacturing cost, lighter weight as well as higher flexibility, as compared with the glass structure of the above-mentioned prior application.

Still another object of the invention is to provide a process and modifications thereof to produce the light-conducting structures.

Other objects of the invention will presently become apparent from the following description.

The foregoing objects have been achieved by the invention, in one aspect of which there is provided a light-conducting structure made of synthetic resin having a refractive index such that in a given cross section transverse to the direction in which light is to advance in the structure, the index varies progressively and steadily with increasing distance away from the center point or center line of the section, which resin comprises a transparent mixture of at least two synthetic polymers having different refractive indexes, the proportion of polymers in the mixture varying progressively with said increasing distance in said cross section thereby to create said variation of the refractive index.

According to the present invention a light-conducting structure made of synthetic resin is produced by a process which comprises preparing a mixture comprising, in a predetermined proportion at least two transparent synthetic polymers having different refractive indexes and having different solubilities into a specific solvent, forming the mixture into a shaped body, and treating the body with the solvent thereby to extract out of the surface of the body a part of the polymers in a proportion different from said original proportion.

BRIEF DESCRIPTION OF THE DRAWINGS

FIG. 2 illustrates the unvarying proportion of polymers A and B in the structure prior to the step of contacting the structure with the solvent, while FIG. 3 illustrates the varying proportion of polymers A and B after the structure has been contacted with solvent.

DETAILED DESCRIPTION

Figure 1:
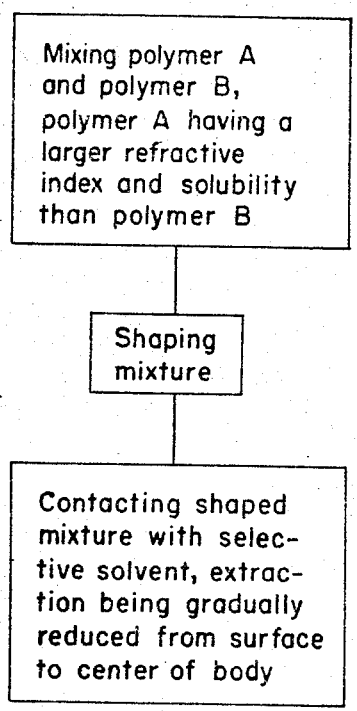
FIG. 1 is a flow diagram which illustrates the process of the invention.
Figure 2:
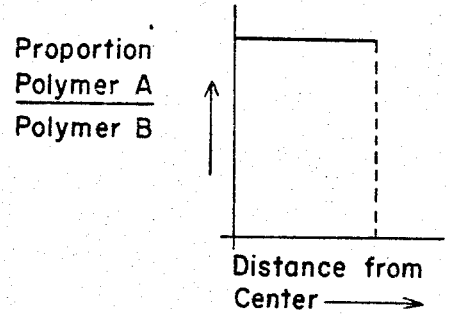
FIGS. 2 and 3 are graphs in which the proportion of polymers A and B have been plotted at varying distances from the center of the light-conducting structure.

The light-conducting structure embodying the present invention is of a shaped body preferably in the form of bar-like shape such as a bar or a fiber. The refractive index in a given cross section perpendicular to the center axis of the body such as a bar or fiber varies gradually from the central port of the cross section to the periphery thereof. It is preferable that the variation or distribution of the refractive index in the cross section be approximately representable by the following equation.

$$N = N_0 (1 - ar^2) \quad (1)$$

wherein:

$r$ is the distance in a radial direction from the center in the cross section, $N_0$ is the refractive index of the mixture at the central part of the structure, $N$ is the refractive index at a point at distance $r$ in the cross section, and $a$ is a constant.

In the case where $a$ is positive, a light-conducting structure which is a particularly important embodiment of the present invention is provided. Incident light beam entering from one end of such a body is conducted therethrough to the opposite end with repetition of vibration around the center axis, the periodic length of the vibration being $2\pi/\sqrt{2a}$, without substantial lagging in the phase velocity and loss of light due to the reflection. The light-conducting structure is equivalent in nature to a convex lens or a system of a plurality of convex lenses, and is capable of image transmission.

In another embodiment of the invention in which the constant $a$ is negative, it is equivalent in nature to a concave lens when the length of the axial direction thereof is relatively short, and can be utilized as a concave lens of small diameter and as a means for correcting chromatic aberration of the light-conducting structure in which the constant $a$ is positive.

The light-conducting glass structure stated above in which the refractive index in a given cross section varies progressively with increasing distance away from the center point in the cross section is one embodiment of the present invention. The invention also includes as another embodiment thereof such structure being disclosed and claimed in copending U.S. Ser. No. 806,368 as a structure having such a refractive index distribution in a cross section perpendicular to a center plane thereof as to satisfy substantially the equation $N=N_0(1-ar^2)$, wherein $N_0$ represents the refractive index at the center line which is the line of intersection of the center plane and the plane of the cross section, N represents the refractive index at a normal point at a distance $r$ from said center line, and $a$ is a constant, whereby light introduced into one end face transverse to said center plane is conducted therethrough to be directed out of other end face opposite said one end face. Such a non-cylindrical or non-concentric structure is equivalent in function to an usual cylindrical lens or a combination of the cylindrical lenses.

The process for producing the light-conducting structure of the present invention will now be described.

The polymers to be used in admixture must be transparent although they are not necessarily colorless, have different refractive indexes, show different solubilities in a specific solvent, and be mixable into an optical homogeneity.

Any combination of polymers may be utilized as long as the above requirements are satisfied. A combination of a homopolymer of monomer X and a copolymer of monomer X plus a small amount of monomer Y, a combination of a copolymer A of monomers X and Y in a certain proportion and a copolymer A' of monomers X and Y in a proportion different from that in the copolymer A, or a combination of homo- or copolymers different only in the degree of polymerization is preferable. Examples of the polymers are homo- or copolymers of styrene, nuclear and/or side chain-substituted styrenes, particularly lower alkyl substituted styrenes such as $\alpha$-methyl styrene and vinyl toluenes, lower alkyl methacrylates, vinyl chloride and vinyl esters. Every polymer has its inherent refractive index. Stabilizers, plasticizers, lubricants, and/or fillers are added to the polymers if desired.

As illustrated in FIG. 1, a polymer A and polymer B are mixed together. In order to obtain a light conducting structure in which the refractive index decreases from the center toward the surface, a polymer A is chosen which has a larger refractive index and greater solubility in a specific solvent than polymer B. The mixture is shaped and then contacted with a selective solvent, so that the extent of the extraction is gradually reduced from the surface to the center of the body.

Preparation of the polymer mixture can be carried out by any convenient procedure. The procedure, in general, depends on the type of the polymers used. Mixing or kneading of heat-plasticized polymers by means of rolls or a kneader, dry-blending of polymer powders, and mixing of polymers in a solution followed by evaporation of the solvent used are typical examples of the procedure. Little or no chemical coupling between the polymers will occur.

The mixture of polymers and optional additives is then molded into a shaped body such as, for example, a bar or a fiber of diameter of 0.05 mm. to 50 mm. In the case where the polymers used is thermoplastic, extrusion and injection moldings are typical, the former being preferable for the production of a rod. In the case where the polymers are thermosetting, compression and transfer moldings are typical. In order to produce a fiber, any of conventional spinning procedures can be employed. The shaped body thus produced is optically homogenous and has a certain refractive index.

The shaped body can be in any structural form such as a plate, a film, a ribbon, a tube, as well as a rod, and a fiber.

The shaped body is then treated with a solvent and thereby caused to undergo the selective extraction. The solvent is of course a "selective solvent" in which one polymer in the polymer mixture of the shaped body is soluble while the other polymer (or polymers) in the mixture is (are) less soluble. Any liquid solvent inclusive of liquefied gases and inclusive of mixtures thereof may be used as long as it is selective. The selectivity of the solvent for a given combination of polymers can easily be ascertained by consultation of certain chemical dictionaries or by a single experiment.

The treatment is preferably carried out by immersing the shaped body into a bath containing the solvent for a certain time.

In order to obtain a light-conducting structure in which the constant $a$ in Equation (1) is positive, it is necessary to select a solvent by which the polymer having a higher refractive index is preferentially extracted. In order to obtain a light-conducting structure in which $a$ is negative, on the other hand, it is necessary to select a solvent by which the polymer having a lower refractive index is preferentially extracted. The extraction can be carried out at room temperature, but a higher temperature may be used thereby to shorten the time required. The higher temperature is below the heat deformation temperature of the shaped body.

Figure 3:
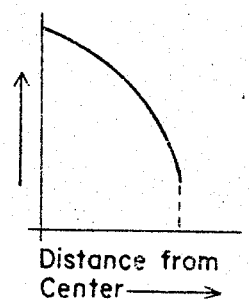

The extent of the selective extraction is reduced gradually from the surface toward the center of the shaped body. After the selective extraction reaches the Central part of the body, the body is withdrawn from the bath, and any solvent on or within the body is evaporated off. The resultant variation in the proportion of polymers from the center toward the surface of the shaped body is illustrated in FIG. 3.

The shaped body after having undergone such an extraction treatment is in some cases finely porous at the surface thereof. In such cases, the body may be drawn in the plastic state into a fiber if the polymers used are thermoplastic.

Figure 4:
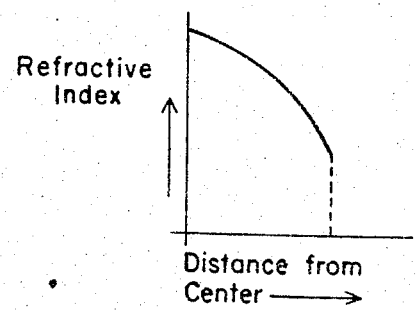
FIG. 4 is a graph in which the refractive index has been plotted at varying distances from the center of the structure and shows that the refractive index varies from the center of the structure towards its surface similarly to the varying proportion of polymers.

The resulting synthetic resin body for light conduction is provided with the refractive index distribution which nearly satisfies Equation (1), as illustrated in FIG. 4 and is capable of conducting the light beam as described above. The refractive index distribution of the body may be regulated by the type of the polymers, polymerization degrees, and mixing ratio of the polymers used, type of the solvent, temperature and time of the impregnation process used, and the diameter of the rod or the fibrous body.

Examples of the present invention are given below. They are not intended to limit the scope of the invention.

EXAMPLE 1

70 parts of methyl methacrylate monomer and 30 parts of styrene monomer was suspended in 200 parts of water, and 0.3 part of benzoyl peroxide was used as a catalyst. These materials were caused to react for approximately 12 hours at approximately 90° C. to obtain a copolymer (polymer A) whose refractive index was 1.518. The refractive index of a copolymer (polymer B) which was obtained by copolymerizing 50 parts of methyl methacrylate monomer and 50 parts of styrene monomer under the same condition was 1.541.

Equal quantities of the polymer A and polymer B were mixed, and the resulting mixture was heated at a temperature ranging from 170 to 190° C. for plasticization, and thereafter it was kneaded by means of rolls until it became optically homogeneous and molded into a rod having a diameter of 5 mm. by means of an extruding machine. Next, this rod was immersed in amyl acetate bath at room temperature for 24 hours. More of the polymer B was extracted from the surface of the rod than the polymer A in the amyl acetate bath. The amyl acetate adhering to or contained in the resulting rod was evaporated. One end of the rod was electrically heated at approximately 165° C., and the portion thus heated was drawn to obtain a fibrous body whose diameter was about 0.1 mm.

The refractive index of the center axis portion of the fibrous body (the value of $N_0$ in the foregoing Equation (1)) was 1.530 and the refractive index on the surface portion was 1.520. The refractive index distribution N in each cross section satisfied approximately the foregoing Equation (1). Accordingly, this fibrous body could be used for light conduction, and an incident light beam entering from one end thereof was transmitted to the other end without causing aberration of phase velocity and loss due to reflection.

EXAMPLE 2

100 parts of vinyl chloride monomer and 0.2 part of polyvinyl alcohol were added to 200 parts of water, and the mixture was subjected to polymerization with a catalyst of lauroyl peroxide (0.2 part) for approximately 24 hours at approximately 60° C. A suitable quantity of sodium bicarbonate to maintain the pH value of the polymerization at 6–8 was added during the polymerization to obtain poly vinyl chloride (polymer A). The refractive index of the resulting polymer A was 1.542. 70 parts of vinyl chloride monomer and 30 parts of vinyl acetate monomer were copolymerized by the same process to obtain a copolymer (polymer B) whose refractive index was 1.515. A mixture of the polymer A (70 parts) and polymer B (30 parts) was heated at temperatures ranging from 160 to 180° C. for plasticization, thereafter kneaded by means of rolls to obtain optical homogeneity, and formed into a rod having a diameter of 5 mm. by means of an extruding machine. This rod was immersed in a 1,2-dichloroethane bath for 10 hours at room temperature. The polymer A was preferentially extracted in the 1,2-dichloroethane bath. After 1,2-dichloroethane adhering to or existing in the resulting rod had been evaporated, a part of the rod was electrically heated at approximately 150° C., and the part thus heated was drawn to obtain a fiber approximately 0.05 mm. in diameter. The refractive index (the value of $N_0$ in the foregoing Equation (1)) of the center axis portion of the fibrous body was 1.540, and the refractive index on the surface portion was 1.534, the refractive distribution in each cross section N approximately satisfied Equation (1). This fibrous body could be used for light conduction, and had an effect similar to that of the fibrous body in Example 1.

What is claimed is:

1. A process for producing a light-conducting structure in the shape of a rod or a fiber, made of synthetic resin, said structure having a refractive index which decreases progressively from the center to the surface which comprises mixing in predetermined proportions, at least two transparent synthetic polymers, said polymers each having a different refractive index and a different solubility in a specific solvent, said polymer having the greater refractive index having a greater solubility in said solvent, shaping said mixture into a body in the form of a rod or a fiber, and contacting said body with said solvent for a time sufficient to extract from the surface of said body a part of said polymers in proportions different from said original proportions, the extent of said selective extraction being reduced gradually from the surface to the center of said body, whereby the proportion of said polymers in said body varies progressively from the center axis to the surface of said structure, thereby providing the varying refractive index.

2. A process as claimed in Claim 1 in which said body is contacted with said solvent by immersing the body into a bath containing said solvent.

3. A process as claimed in Claim 1 in which the product, after the step of treating with said solvent, is then heated and subjected in the plastic state to drawing.

4. A process as in Claim 1 in which each of said transparent synthetic polymers comprises units of a common monomer and at least one of said polymers is a copolymer of said common monomer and another monomer copolymerizable therewith.

5. A process as claimed in Claim 4 in which said two polymers are poly(vinyl chloride) and a copolymer of vinyl chloride and vinyl acetate.

6. A process as claimed in Claim 5 in which said solvent is 1,2-dichloroethane.

7. A process as claimed in claim 1 in which each of said polymers is a copolymer of the same two monomers, each of said monomers being present in each of said copolymers in different proportions.

8. A process as claimed in Claim 7 in which said two monomers are methyl methacrylate and styrene.

9. A process as claimed in Claim 8 in which said solvent is amyl acetate.

10. A process as claimed in Claim 1 in which the variation of the refractive index in a given cross section of the structure is defined by the following equation, $$N = N_0(1 - ar2)$$

wherein r is the distance in a radial direction from the center in the cross section of said structure, $N_0$ is the refractive index of the mixture at the central part of the structure, N is the refractive index at a point at distance r in the cross section, and a is a positive constant.

References Cited

UNITED STATES PATENTS

| 2,948,048 | 8/1960 | Jankens | 264—51 X |
| 3,323,978 | 6/1967 | Rasmussen | 161—169 |
| 3,458,248 | 7/1969 | Eversole | 264—2 X |

FOREIGN PATENTS

| 1,043,762 | 9/1966 | Great Britain | 264—Dig. 8 |
| 1,066,061 | 4/1967 | Great Britain | 264—49 |
| 836,080 | 6/1960 | Great Britain | 264—53 |

PHILIP E. ANDERSON, Primary Examiner

U.S. Cl. X.R.

161—166, 172, 176; 260—2.5 M, 86.7, 899, 901; 264—1, 210 F, 293, Dig. 13